United States Patent [19]

Louch et al.

[11] Patent Number: 5,039,063

[45] Date of Patent: Aug. 13, 1991

[54] SMOOTH BORE SLIDE VALVE

[75] Inventors: David B. Louch; Richard D. Favinger, both of Littleton, Colo.

[73] Assignee: Marathon Oil Company, Findlay, Ohio

[21] Appl. No.: 552,398

[22] Filed: Jul. 13, 1990

[51] Int. Cl.$^5$ ............................................. F16K 3/02
[52] U.S. Cl. ..................................... 251/326; 251/151
[58] Field of Search ................ 251/326, 328, 148, 151

[56] References Cited

U.S. PATENT DOCUMENTS

| 3,113,757 | 12/1963 | Nixon | 251/141 |
| 3,286,736 | 11/1966 | Guillermic | 251/326 X |
| 3,348,570 | 10/1967 | Nealy | 251/151 X |
| 3,614,061 | 10/1971 | Fitzpatrick | 251/328 X |
| 3,799,191 | 3/1974 | Burkhardt et al. | 137/454.2 |
| 3,918,471 | 11/1975 | Bedner | 137/238 |
| 4,023,773 | 5/1977 | Wise | 251/148 |
| 4,221,307 | 9/1980 | Peterson | 222/428 |
| 4,456,026 | 6/1984 | Kantor | 137/315 |
| 4,676,479 | 6/1987 | Ogawa et al. | 251/151 |

FOREIGN PATENT DOCUMENTS 1232817  5/1971  United Kingdom ................ 251/146

Primary Examiner—John C. Fox
Attorney, Agent, or Firm—Jack L. Hummel; Jack E. Ebel

[57] ABSTRACT

A valve which minimizes fluid turbulence. The valve body has inlet and outlet ports at the end of threaded counterbores. Threaded collars mounted on the ends of the conduits are locked in place in the counterbores. A flange such as a snap ring on the conduits is engaged by a transverse wall on the collars to prevent movement of the conduits away from the valve body. A sliding valve element containing a flow opening permits fluid to flow through the valve when in open position. The interior of the valve body, the opening in the sliding valve member, the inlet and outlet ports and the inside diameter of the conduits are the same dimension with no gaps therebetween, creating a smooth bore.

5 Claims, 3 Drawing Sheets

SMOOTH BORE SLIDE VALVE

FIELD OF THE INVENTION

This invention relates to fluid valves. More particularly, it relates to fluid valves which do not cause excessive turbulence.

BACKGROUND OF THE INVENTION

In certain fluid flow environments, it is necessary to avoid turbulence resulting from operation of the valve. This is especially so in connection with laboratory tests where turbulence would interfere with or cause erroneous conclusions in low-volume experimental runs.

One example of the need for accurate readings in low-volume fluid systems is found in the petroleum industry, where the same pipe line may be used to pump different types of crude oil, such as so-called "sweet" and "sour" crude oils. The need to determine whether one type of crude oil is contaminated by the other and, if so, the degree to which such contamination occurs, has necessitated appropriate laboratory experiments to be conducted under controlled flow conditions. Typically, the experiments require the pumping of crude oil from one conduit or test chamber through another conduit separated from the first conduit by a valve. The valve would be closed while oil is introduced into the first conduit, then opened to permit flow. Subsequently it would be closed again to quickly shut off flow. It is important to the integrity of the experiment to avoid turbulence when the valve is opened and closed under these conditions.

Although it was determined that a valve which does not create turbulence would be highly desirable in the above and other fluid mixing studies, no appropriate valve for the purpose was found to be available. It was theorized that a valve capable of functioning in this manner should have no gaps or grooves in the flow path which might create turbulence, but should have an essentially smooth bore. This requirement is not limited to the flow path within the valve body itself, but also to the connection between the conduits and the inlet and outlet of the valve. It was also determined that the valve assembly should be capable of being quickly connected to and disconnected from inlet and outlet conduits without adversely affecting its smooth bore construction.

It was therefore an object of the invention to provide a smooth bore valve capable of meeting the above requirements.

BRIEF SUMMARY OF THE INVENTION

In accordance with the invention, the valve comprises a valve body having inlet and outlet ports, a chamber connecting the ports and valve means for opening and closing the chamber to fluid flow therethrough. The interior dimensions of the chamber and ports, as well as the interior dimensions of the conduits connected to the valve body, are the same, thus having a smooth bore in the open position. A collar is mounted on adjacent portions of the conduits, and means are provided for holding the collars in locked position relative to the valve body. In addition, means coacting between the collars and the conduits are provided to hold the adjacent ends of the conduits in engagement with the valve body and in alignment with the ports.

Preferably, the collars are held in locked position by screw threads on the exterior of the collars which engage mating threads in cavities or recesses in the valve body, and the coacting means which hold the adjacent ends of the conduits in engagement with the valve body comprise shoulder means on the collars which engage lug means on the conduits. In a preferred embodiment the lug means comprises a snap ring on the conduit located a short distance from the end of the conduit. A quick-acting slide valve, containing an opening aligned with the flow path when the valve is in open condition, preferably is employed.

The invention enables plastic pipe of constant inside and outside diameter to be quickly connected and disconnected to and from the valve body so as to provide a continuous smooth bore flow path. Transparent PVC pipe can thus be used in order to visually monitor conditions in a laboratory flow system.

The features enabling the valve to function in the desired manner are brought out in more detail below in connection with the description of the preferred embodiment, wherein the above and other aspects of the invention, as well as other benefits, will readily be apparent.

DETAILED DESCRIPTION OF THE PREFERRED EMBODIMENT

Figure 1:
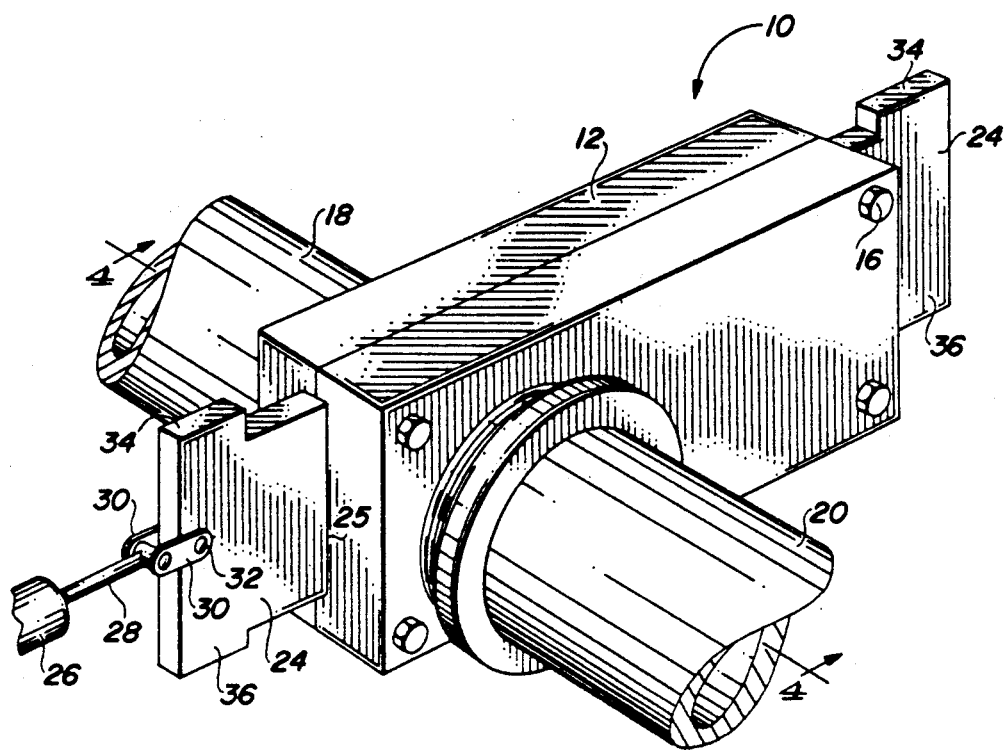
FIG. 1 is a pictorial view of the valve of the present invention.

Referring to FIG. 1, a valve body or housing 10 comprises two plates 12 and 14 connected together at their corners by bolts 16. Inlet and outlet conduits 18 and 20 are connected to the housing by collars 22 in a manner described in detail below. A slide valve element 24 containing a flow opening is mounted in a slot 25 in the housing so that it can be moved transversely of the housing between open and closed positions by pneumatic cylinder 26. The piston rod 28 of the cylinder is connected to the slide element 24 by means of links 30 attached to the piston rod and to a pin 32 extending through an opening in the slide element 24. The cylinder typically is actuated by an pneumatic switch, not shown. Although a single cylinder has been illustrated for moving the valve element 24 in both directions, it will be understood that one cylinder could be provided for moving the slide member in one direction and another for moving it in the opposite direction. Other means, such as a solenoid, could be employed to move the slide element as long as it can be suitably controlled and is capable of moving the slide element as rapidly as needed.

Still referring to FIG. 1, the ends of the slide element 24 are provided with upwardly and downwardly extending lugs 34 and 36 which extend above and below the slot in which the slide element is mounted in order to provide a mechanical limit to the transverse movement of the slide in either direction.

Figure 2:
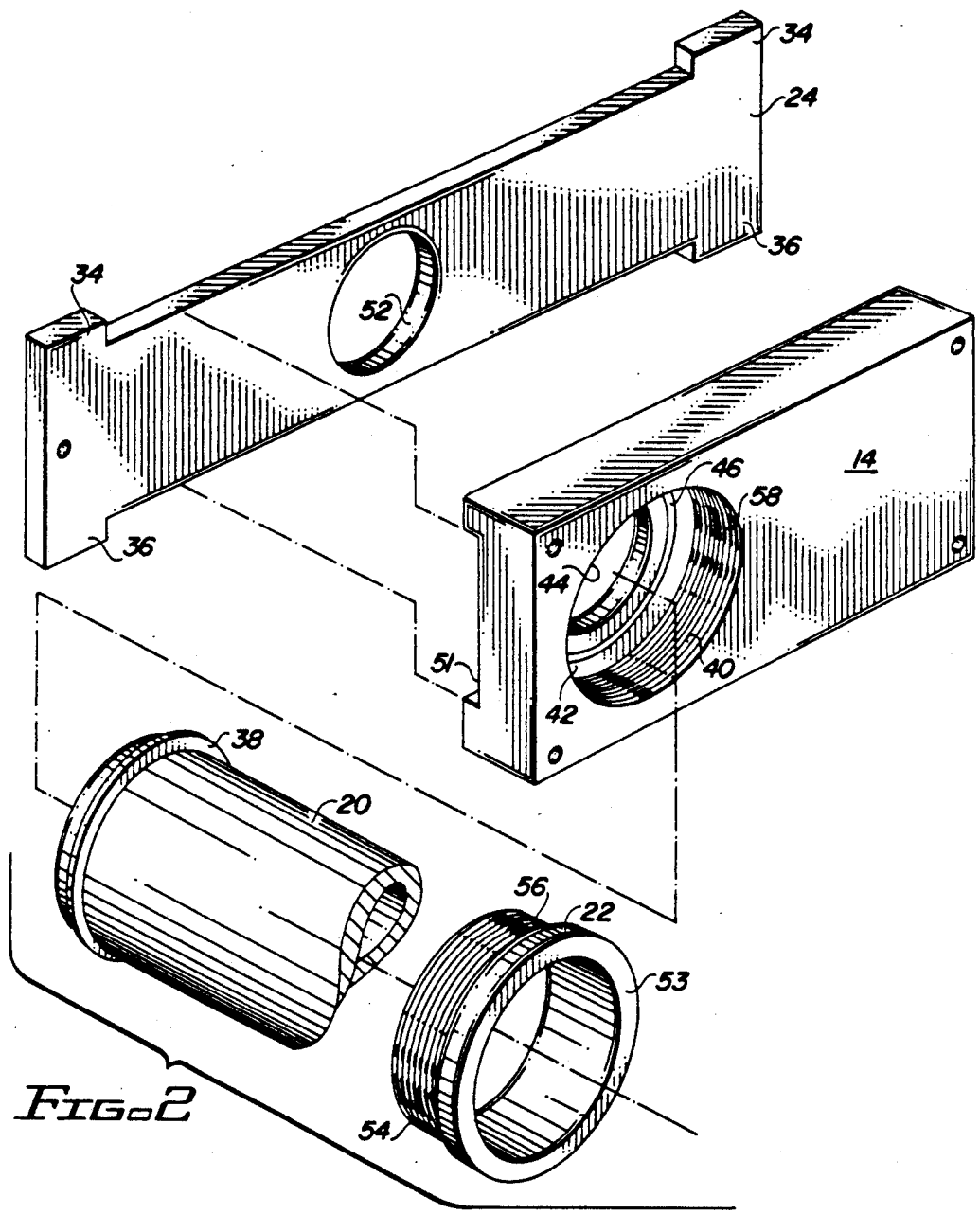
FIG. 2 is an exploded pictorial view of the elements connected to one side of the valve body.
Figure 3:
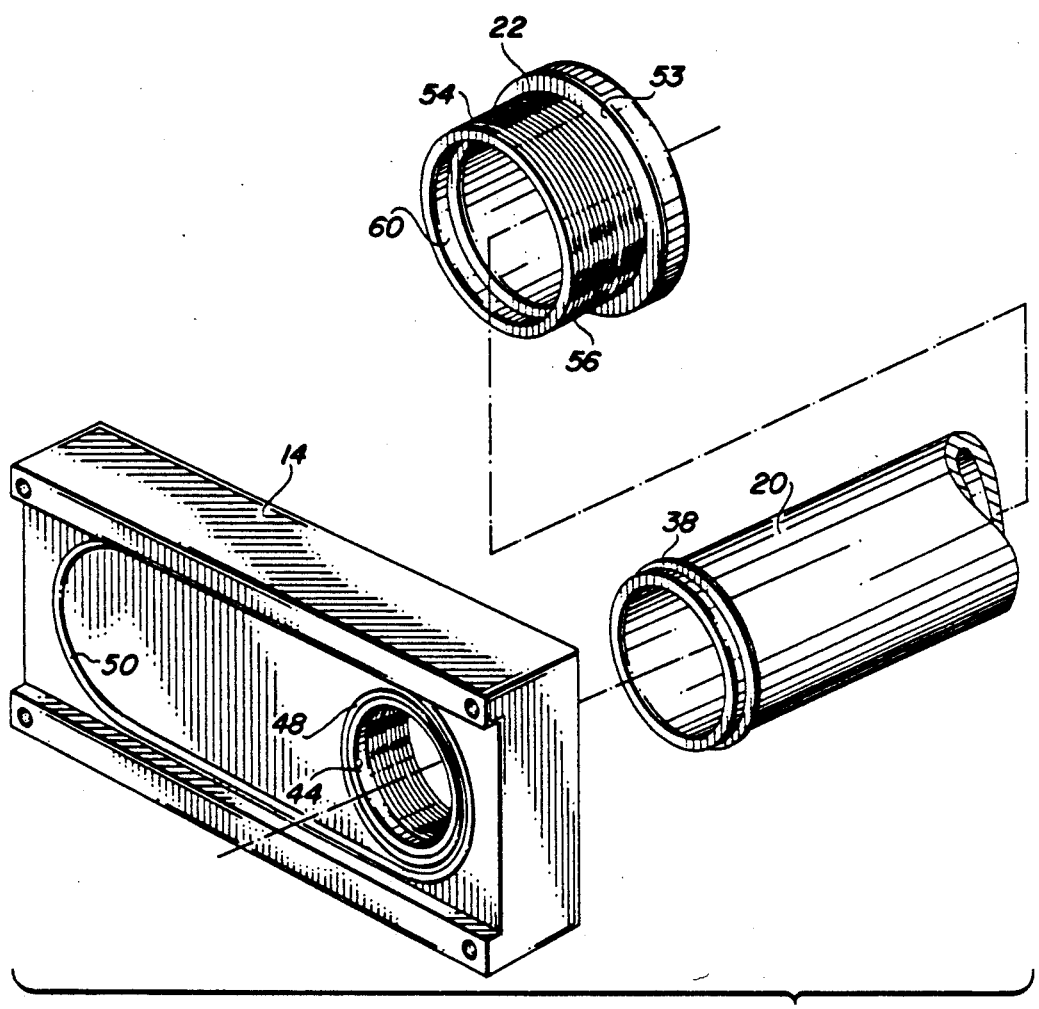
FIG. 3 is is an exploded pictorial view of the elements of FIG. 2, shown from the opposite perspective.

As shown in FIGS. 2 and 3, a snap ring 38 fits over the conduit 20 at a point spaced a short distance from the inner end of the conduit, and the inner portion of the conduit is received by an enlarged recess 40 in the housing plate 14. The recess 40 terminates in a bottom wall 42 which surrounds outlet port 44. A suitable seal, such as O-ring 46, is provided in the bottom wall 42 to prevent leakage between the end of the conduit 20 and the bottom wall of the recess 40. On the inner face of the housing plate 14 concentrically arranged O-rings 48 and 50 are provided in grooves surrounding the outlet port 44 to prevent leakage between the slidable valve element 24 and the housing plate 14. Although not shown in FIGS. 2 and 3, it will be understood that a similar arrangement is provided in the inlet conduit 18 and the housing plate 12.

The inner face of the housing plate 14 is shown in FIGS. 2 and 3 to contain a rectangularly shaped transverse groove 51 which together with a similar groove in the housing plate 12 form the slot 25 in which the valve element 24 slides. As shown in FIG. 2, the slide element 24 contains a circular opening 52 which is aligned with the inlet and outlet ports when the slide is in its open position to permit fluid to flow therethrough.

Still referring to FIGS. 2 and 3, the collar 22 has a constant inside diameter which extends throughout a short enlarged flange or gripping portion 53 and a longer extended portion 54. The collar is dimensioned to slide over the conduit 20, with the extended portion fitting into the recess 40 in the housing plate 14. The extended portion 54 of the collar is provided with external screw threads 56 designed to engage mating internal threads 58 in the housing recess 40. The surface of the collar flange 53 may be roughened to provide a better grip for manual assembling of the valve connection. In addition, the inner end of the extended collar portion 54 is recessed as shown at 60 in FIG. 3 for a purpose to be explained below.

Figure 4:
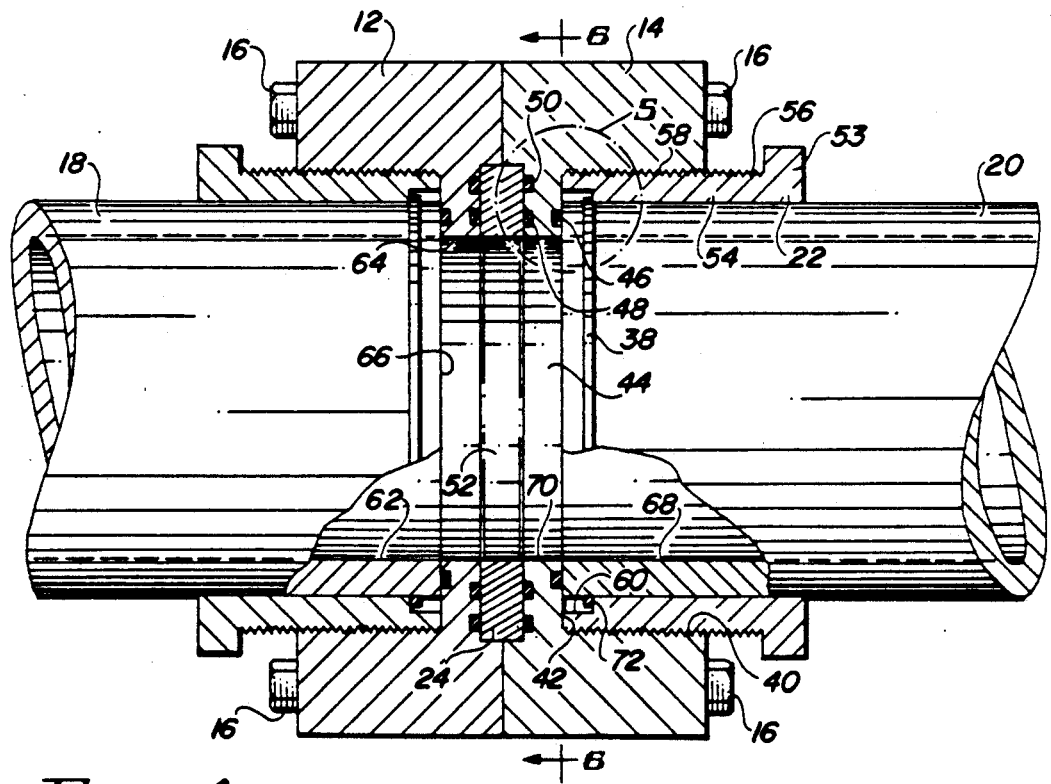
FIG. 4 is an enlarged longitudinal sectional view taken on line 4—4 of FIG. 1, showing the valve in open condition.

Referring now to FIG. 4, with the sliding valve element 24 in open position, it can be seen that there is a continuous smooth bore exposed to fluid flowing through the valve. Specifically, the inner diameter 62 of the inlet conduit 18 is the same dimension as the passageway 64 extending inwardly from the inlet port 66 in the housing plate 12. Similarly, the inner diameter 68 of the outlet conduit 20 and the passageway 70 extending inwardly from the outlet port 44 are of the same dimension. The diameter of the opening 52 in the valve slide element 24 is also of the same dimension. With the end of the outlet conduit 20 abutting the bottom wall 42 of the recess 40 in the housing plate 14 and the end of the inlet conduit 18 being similarly arranged with respect to the housing plate 12, the engagement of the slide element 24 with the housing plates 12 and 14 adjacent the opening 52 in the valve slide element completes a continuous flow path through contiguous components of the valve structure.

Figure 5:
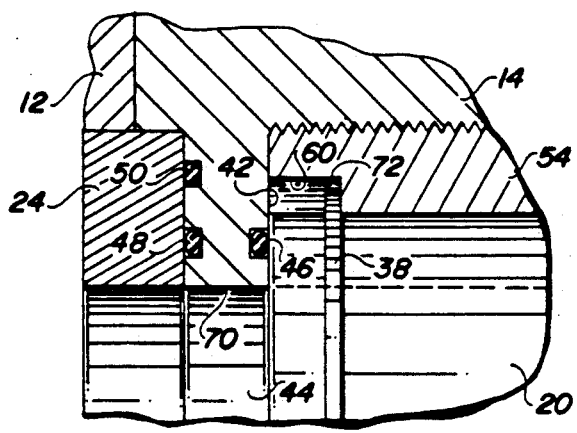
FIG. 5 is an enlarged sectional view of the area enclosed by the circle 5 in FIG. 4.

Each conduit is connected to the valve body in the same manner. Referring to the outlet side of the valve shown in FIGS. 2, 3 and 4 for the purpose of explanation, the collar 22 is slipped over the end of the conduit 20 and the conduit is inserted into the recess 40 until the end of the conduit abuts the bottom wall 42 of the recess 40. When the end of the conduit is bottomed in this manner, it engages the O-ring 46 to seal the abutting surfaces. The collar 22 is then threaded into the recess 40 until the end of the collar also abuts the bottom wall 42 of the recess 40. This is the final position of the collar and conduit relative to the valve housing 10 and is best shown in FIG. 4 and in the enlarged partial sectional view of FIG. 5.

Note that in moving the collar into place the bottom wall 72 of the recess 60 in the end of the collar portion 54 will engage the snap ring 38 and force the conduit into tight engagement with the bottom wall 42 of the recess 40. Because the engaged threads 56 and 58 of the collar 22 and the housing recess 40 prevent axial movement of the collar, the engagement between the bottom wall 72 of the collar recess and the snap ring 38 mounted on the conduit 20 prevents axial movement of the conduit 20 away from the valve. This arrangement enables a smooth conduit, such as one comprised of a PVC plastic pipe, to be held in abutting relationship with the valve body so as to provide for a smooth flow path through the valve. By permitting the conduits to be pushed rather than threaded or otherwise manipulated into place, the conduits can readily be arranged so that fill and drain vents in the conduits may conveniently be made to face up or down to permit easy filling and draining of fluid. This is not possible with conduits which are connected by threads because thread wear eventually results in the conduits having slightly different final positions with respect to alignment of points on the conduit such as drain and fill vents. Thread wear can also result in the conduit eventually not abutting against the housing to the same extent as in initial installations, thereby possibly deteriorating the smooth bore desired to be presented to the fluid.

As shown and described above, the depth of the recess 60 in the collar portion 54 is correlated with the location of the snap ring on the conduit so that when the collar end abuts the bottom wall 42 of the housing recess 40, the bottom wall 72 of the recess 60 engages the ring. Although this is the preferred arrangement since it provides for the bottoming of the collar to indicate that the conduit is properly positioned, the collar need not abut the bottom of the recess 40. As long as the bottom wall 72 of the collar recess 60 engages the snap ring and thereby holds the conduit in place against the port in the adjacent housing, the end of the collar can be spaced from the bottom wall 42 of the recess 40.

Figure 6:
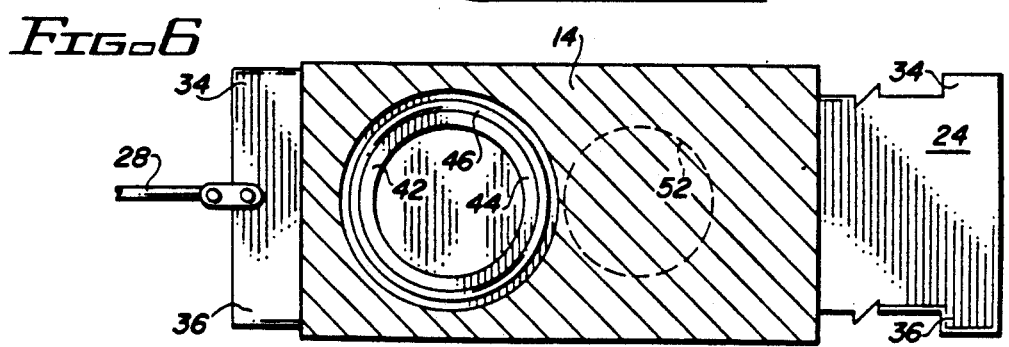
FIG. 6 is a transverse sectional view taken on line 6—6 of FIG. 4, showing the valve in closed condition.

Referring to FIG. 6, it can be seen that when the slide valve element 24 is in closed position the element 24 blocks the outlet port 44. In this condition the opening 52 in the slide element is positioned in the housing slot 25 behind the solid portions of the housing plates 12 and 14 and is not accessible to the fluid due to the presence of the seals 48 and 50 surrounding the ports on the interior faces of the housing plates. When in open position the opening 52 is aligned with the inlet and outlet ports in the valve body to form the continuous smooth bore through the valve body illustrated in FIG. 4.

As mentioned above, the invention allows the use of plastic unthreaded conduits which enables them to be pushed into place with any predetermined part of the conduit facing in any predetermined direction. This also permits the use of transparent piping, which is of particular benefit in experimental laboratory fluid systems. The invention is not limited to the use of plastic pipe, however, since the collar arrangement which controls the positioning of the conduit will also function with smooth conduits formed of other materials.

Although the use of a retainer ring on the conduits is preferred because of the simplicity of design and the ease with which the retainer ring can be positioned with respect to the depth of the collar recess, the valve would adequately function without a retainer ring as long as comparable means are provided for engaging the bottom wall of the collar recess. For example, any type of transversely or radially extending lugs or flanges which are attached to or formed integrally with the conduits and which can be suitably engaged by the bottom wall of the collar recess would also allow the collar to hold the conduit in place.

Although the valve may be constructed of any materials having sufficient strength to withstand repeated use while providing for a smooth bore, brass collars and slide valve members and aluminum valve body plates are preferred.

It will be apparent from the foregoing description that the invention is not necessarily limited to all the specific details described in connection with the preferred embodiment, but that changes to certain features which do not alter the overall basic function and concept of the invention may be made without departing from the spirit and scope of the invention, as defined in the appended claims.

What is claimed is:

1. In a substantially nonturbulent fluid flow path between spaced adjacent ends of inlet and outlet conduits, a slide valve assembly comprising:
   a valve body having inlet and outlet ends;
   the valve body containing inlet and outlet ports and a chamber connecting said ports;
   the valve body containing a recess in each of the inlet and outlet ends, the recesses surrounding and terminating at the inlet and outlet ports;
   the interior dimensions of the chamber, the ports and the conduits being substantially the same and aligned with each other;
   a slide valve element slidably mounted in the valve body and containing an opening of substantially the same dimensions as the aforesaid dimensions;
   the conduits abutting the valve body adjacent the ports therein and the valve element engaging the valve body so that the fluid flow path formed thereby is of substantially uniform transverse dimension when the opening of the valve element is aligned with the conduits, the ports and the chamber;
   a collar mounted on each adjacent portion of the spaced conduits, the collars extending into the valve body recesses;
   locking means for holding the collars in locked position in said recesses;
   an annular recess in the end of each collar adjacent the valve body, each recess including a bottom wall extending transversely of the longitudinal axis of the collar and defining the extremity of the recess; and
   lug means on the conduits near the ends thereof extending radially outwardly therefrom;
   the bottom wall of each collar recess engaging the radially extending lugs to maintain the conduits in abutting condition with the valve body.

2. The valve of claim 1, wherein the lug means is spaced from the end of the conduit a distance substantially equal to the distance that the bottom wall of the annular recess is spaced from the aforesaid end of the collar.

3. The valve of claim 1, wherein the lug means comprises a circumferential flange spaced from the end of the conduit and wherein the outside diameter of the conduits is constant.

4. The valve of claim 3, wherein the conduits are comprised of plastic pipe.

5. The valve of claim 3, wherein the circumferential flange comprises a snap ring.

* * * * *